United States Patent
Deng (10) Patent No.: US 6,919,650 B2
(45) Date of Patent: Jul. 19, 2005

(54) HYBRID SYNCHRONIZATION PHASE ANGLE GENERATION METHOD

(75) Inventor: Doug D. Deng, Canton, MI (US)

(73) Assignee: Ballard Power Systems Corporation, Dearborn, MI (US)

(*) Notice: Subject to any disclaimer, the term of this patent is extended or adjusted under 35 U.S.C. 154(b) by 346 days.

(21) Appl. No.: 10/159,603

(22) Filed: May 31, 2002

(65) Prior Publication Data

US 2003/0222507 A1 Dec. 4, 2003

(51) Int. Cl.$^7$ ............................................. H03K 19/082
(52) U.S. Cl. ...................................... 307/45; 307/127
(58) Field of Search .......................... 363/13; 307/44, 307/134, 127, 126, 153, 45

(56) References Cited

U.S. PATENT DOCUMENTS

| | | | |
|---|---|---|---|
| 4,367,522 A | | 1/1983 | Forstbauer et al. .......... 363/137 |
| 4,399,395 A | * | 8/1983 | Espelage .................... 318/803 |
| 4,656,413 A | | 4/1987 | Bourbeau .................... 322/47 |
| 4,665,474 A | | 5/1987 | Neupauer .................... 363/35 |
| 4,766,327 A | | 8/1988 | Fox ............................. 307/87 |
| 5,083,039 A | | 1/1992 | Richardson et al. .......... 290/44 |
| 5,138,248 A | | 8/1992 | Vogt et al. .................. 323/273 |
| 5,148,361 A | | 9/1992 | Braun et al. ................. 363/95 |
| 5,329,221 A | | 7/1994 | Schauder .................... 323/207 |
| 5,369,564 A | | 11/1994 | Choi ........................... 363/71 |
| 5,625,539 A | | 4/1997 | Nakata et al. ................ 363/17 |
| 5,798,633 A | | 8/1998 | Larsen et al. ............... 323/207 |
| 5,828,253 A | | 10/1998 | Murayama ................... 327/156 |
| 5,856,761 A | | 1/1999 | Jokura ......................... 331/11 |
| 5,892,354 A | | 4/1999 | Nagao et al. ................ 323/299 |
| 5,892,664 A | | 4/1999 | Vedder ........................ 363/17 |
| 6,058,035 A | | 5/2000 | Madenokouji et al. ........ 363/95 |
| 6,111,767 A | | 8/2000 | Handleman ................... 363/95 |
| 6,239,997 B1 | | 5/2001 | Deng ........................... 363/95 |
| 6,362,988 B1 | | 3/2002 | Deng et al. ................. 363/148 |
| 6,385,066 B1 | * | 5/2002 | Garces et al. ................. 363/87 |

OTHER PUBLICATIONS

Hirose, S. et al., "Multi–Microcomputer–Based Controller for 12 MW GTO Power Conditioning Systems," in *Proceedings of the Annual Power Electronics Specialists Conference (PESC)*, Kyoto, Japan, Apr. 11–14, 1988, pp. 611–618.

Hwang, I–C. et al., "A Digitally Controlled Phase–Locked Loop With a Digital Phase–Frequency Detector for Fast Acquisition," *IEEE Journal of Solid State Circuits* 36(10):1574–1581, Oct. 2001.

Lin, C. et al., "Development of a General–Purpose Demand–Side Battery Energy Storage System," in *Proceedings of the 30$^{th}$ IAS Annual Meeting*, Orlando, FL, Oct. 8–12, 1995, pp. 1893–1899.

Tazume, K. et al., "Novel Method for Controlling an Interconnection Inverter Operating as an Active Power Filter and for Controlling its Input Power," in *Proceedings of the 12$^{th}$ Annual Applied Power Electronics Conference and Exposition*, Atlanta, GA, Feb. 23–27, 1997, pp. 431–435.

* cited by examiner

*Primary Examiner*—Shawn Riley
(74) *Attorney, Agent, or Firm*—Seed IP Law Group PLLC (57) ABSTRACT

A hybrid use of a phase-locked-loop controller and a microprocessor-based controller to synchronize the phase angles of a three-phase AC power source, such as a static power converter, with those of a three-phase power grid. The phase-angle synchronization may enable the AC power source to be safely connected to the power grid to provide additional power capacity.

50 Claims, 5 Drawing Sheets

HYBRID SYNCHRONIZATION PHASE ANGLE GENERATION METHOD

BACKGROUND OF THE INVENTION

1. Field of the Invention

The present invention relates generally to the synchronization of a three-phase Alternating Current (AC) power source to a three-phase power grid. Specifically, the preferred embodiments of the present invention relate to the synchronization of the voltage phase angles of static power converters to those of a three-phase power grid.

2. Description of the Related Art

As society continues to advance technologically and economically, it becomes increasingly dependent on energy such as electrical power to drive the advancement. Indeed, the shortage of electrical power may hinder such advancement and wreak havoc on society, which relies on electricity for everyday commerce and living. The California energy crisis of 2001 highlights this reliance on electricity and demonstrates the need to provide additional electrical power generators wherever and whenever increased power consumption is detected.

As known, each geographical region in countries such as the United States is supplied with electricity from power plants via a three-phase power grid. Traditionally, large power plants were built to meet the increased demand of power consumption. However, large power plants require large transmission lines to supply electricity to regional power grids, and new plants and transmission lines require substantial financial investment. Additionally, obtaining governmental approval to site and build new power plants and transmission capacity is becoming more difficult due to complex issues ranging from environmental concerns and potential health effects of electromagnetic fields (EMF) to other special interest groups' concerns.

An alternative to large power plants is the use of small low cost power generators connected in parallel to power grids to provide added power capacity during peak power consumption periods in order to reduce the strain on power grids. For instance, a peak period may occur during the summer, when widespread air conditioning use becomes taxing on the power grids. AC power sources, such as static power converters (SPCs) drawing power from batteries, fuel cells, and the like, have been used as low cost power generators to provide added power capacity to power grids during peak periods. As with the connection of a large power plant to an existing power grid, when connecting an additional AC power source, such as a static power converter, to a three-phase power grid, synchronization of the amplitudes, frequencies, and phase angles of the existing voltage on the power grid and the output voltage of the AC power source is required. Without synchronization, the discrepancies in the amplitudes, frequencies, and/or phase angles between the two parallel voltages may cause abnormal current to circulate between the grid and the additional power source and damage both systems.

Typically, when connecting a three-phase AC power source such as a SPC with a three-phase power grid, a phase-locked loop (PLL) technique is used in the AC power source to control its phase synchronization with the grid. In abnormal operating conditions, if the grid voltage is lost for a short time, e.g., 0.1 second, and a circuit switch has a bounce action, the PLL will not function properly without its feedback inputs from the power grid. Thus, under fault conditions, when the PLL loses synchronization with the grid, abnormal current such as over current and distortion current may occur. Consequently, the AC power source will not realize reliable parallel operation with the grid. And as mentioned earlier, the abnormal current may also damage both the AC power source and the power grid.

BRIEF SUMMARY OF THE INVENTION

The above background introduction shows that when connecting a three-phase AC power source such as a SPC with a three-phase power grid, there is a need to synchronize the voltage phase angle of the AC power source with the voltage phase angle of the power grid to which the AC power source supplies the voltage. With the voltage phase angles synchronized, the voltage frequencies are also synchronized.

Accordingly, in one aspect a phase angle synchronization method to connect an AC power source with a power grid is disclosed, wherein the AC power source can reliably generate a voltage phase angle for the AC power source that matches with the phase angle of the power grid in normal and abnormal operation conditions. Thus, the voltage frequency of the AC power source is also synchronized with the voltage frequency of the power grid.

In another aspect, a hybrid synchronization phase-angle generator to connect a three-phase AC power source with a three-phase power grid is disclosed, wherein the generator uses a combination of the conventional PLL and a microprocessor-based controller in the AC power source to perform phase angle synchronization.

Additional aspects and novel features of the invention will be set forth in part in the description that follows, and in part will become more apparent to those skilled in the art upon examination of the disclosure.

BRIEF DESCRIPTION OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements, as drawn, are not intended to convey any information regarding the actual shape of the particular elements, and have been solely selected for ease of recognition in the drawings.

DETAILED DESCRIPTION OF THE INVENTION

In the following description, certain specific details are set forth in order to provide a thorough understanding of various embodiments of the invention. However, one skilled in the art will understand that the invention may be practiced without these details. In other instances, well-known structures associated with power conversion, microprocessors and phase-locked loop control circuits have not been shown or described in detail to avoid unnecessarily obscuring descriptions of the embodiments of the invention.

Unless the context requires otherwise, throughout this specification and claims which follow, the word "comprise" and variations thereof, such as, "comprises" and "comprising" are to be construed in an open, inclusive sense, that is as "including, but not limited to."

The headings provided herein are for convenience only and do not interpret the scope or meaning of the claimed invention.

Figure 1:
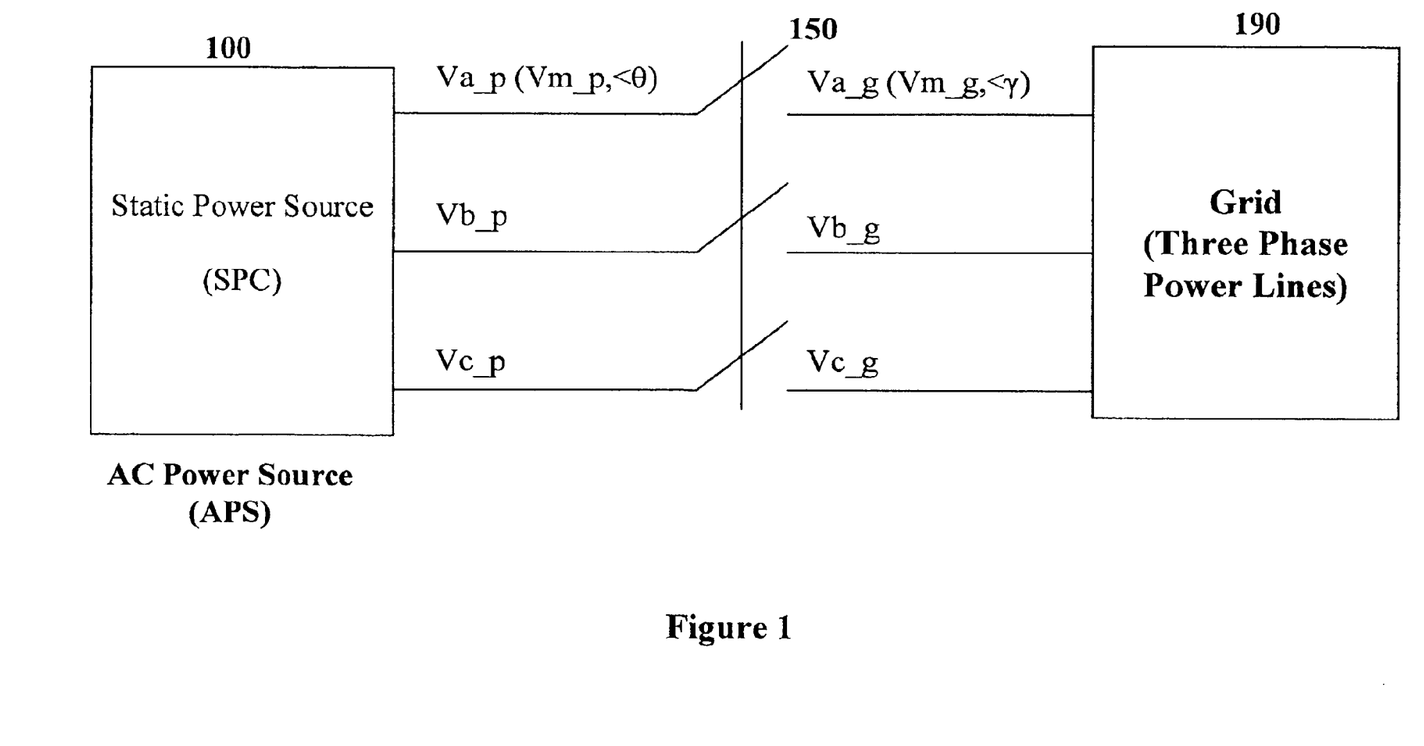
FIG. 1 is a schematic diagram showing a parallel connection between a three-phase AC power source and a three-phase power grid in which phase angle synchronization can be performed in accordance with an illustrated embodiment of the invention.

FIG. 1 shows a parallel connection between a three-phase AC power source 100, such as a SPC, and a three-phase power grid 190. The SPC voltages have three phases: Va_p, Vb_p, and Vc_p. Each phase voltage includes a voltage magnitude component and a phase angle component. For instance, the source phase A voltage Va_p includes a magnitude component Vm_p and a phase angle component $\pi\theta$. As understood in the art, the next source phase B voltage Vb_p will have the same magnitude component Vm_p and a phase angle that is 120° from $\theta$, and so on. Thus, if Vm_p≅Sin($\theta$) represents phase A voltage Va_p of the AC power source, phase B voltage Vb_p and phase C voltage Vc_p of the AC power source are represented by Vm_p≅Sin($\theta$+120°) and Vm_p≅Sin($\theta$+240°), respectively.

Likewise, the power grid voltages have three phases: Va_g, Vb_g, and Vc_g. Each of the grid voltages also includes a voltage magnitude component and a phase angle component. For instance, the grid phase A voltage Va_g includes a magnitude component Vm_g and a phase angle component $\pi\theta$. Thus, if Vm_g≅Sin($\gamma$) represents phase A voltage Va_g of the SPC, phase B voltage Vb_g and phase C voltage Vc_g of the grid are represented by Vm_g≅Sin($\gamma$+120°) and Vm_g≅Sin($\gamma$+240°), respectively.

When the AC power source 100 is operated in parallel with the power grid 190, the voltage magnitude Vm_p of the AC power source should be equal to the voltage magnitude Vm_g of the grid, and the phase angle $\theta$ (and thus the voltage frequency) of the AC power source should be equal to the phase angle $\gamma$ (and the voltage frequency) of the grid. Once such synchronization is achieved, i.e., Vm_p=Vm_g and $\theta$=$\gamma$, the circuit breakers 150 can be closed. The synchronization is kept so long as the circuit breakers are closed to prevent abnormal current conditions and possible damage to the AC power source 100 and/or the power grid 190. The present invention provides a reliable system and method to achieve phase angle synchronization between the AC power source 100 and the power grid 190, which is achieved when $\theta$=$\gamma$.

Figure 2:
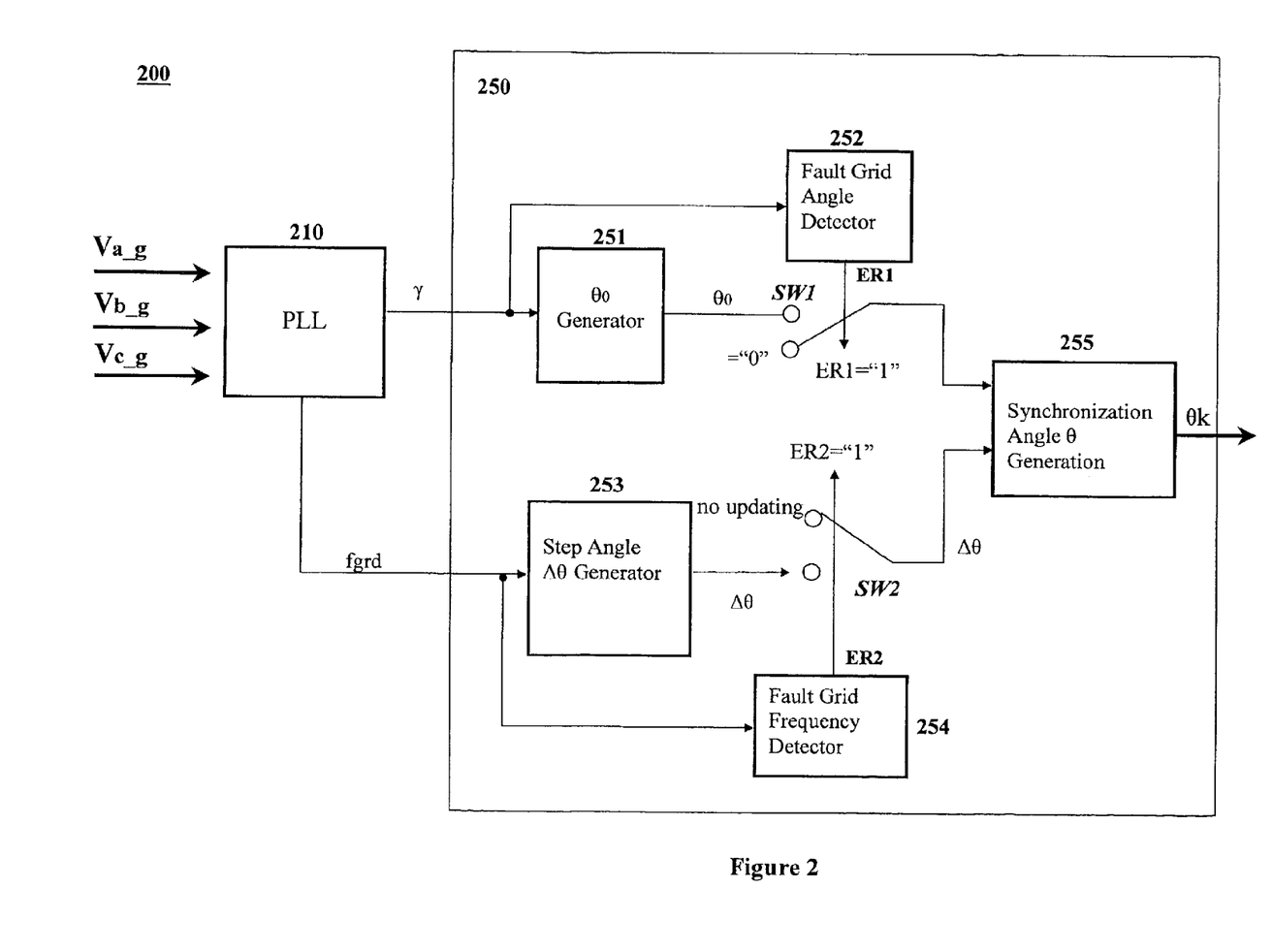
FIG. 2 is a functional block diagram of a hybrid synchronization phase angle generator in accordance with an illustrated embodiment of the invention.

FIG. 2 is a functional block diagram of a synchronization phase angle generator 200 to match or synchronize the source phase angle $\theta$ with the grid phase angle $\gamma$, in accordance to an embodiment of the invention. The synchronization phase angle generator 200 includes a PLL controller 210 and a digital microprocessor-based controller 250. The PLL controller 210 and the digital controller 250 can be electronically implemented in a manner known in the art. The digital controller 250 is based on the theory of AC electrical machines and includes: a $\theta_0$ generator module 251, a step angle $\Delta\theta$ generator module 253, a fault grid frequency detector module 254, a fault grid angle detector module 252, and a synchronization angle $\theta$ generation block or module 255. Each of these modules is described in detail below.

Figure 3:
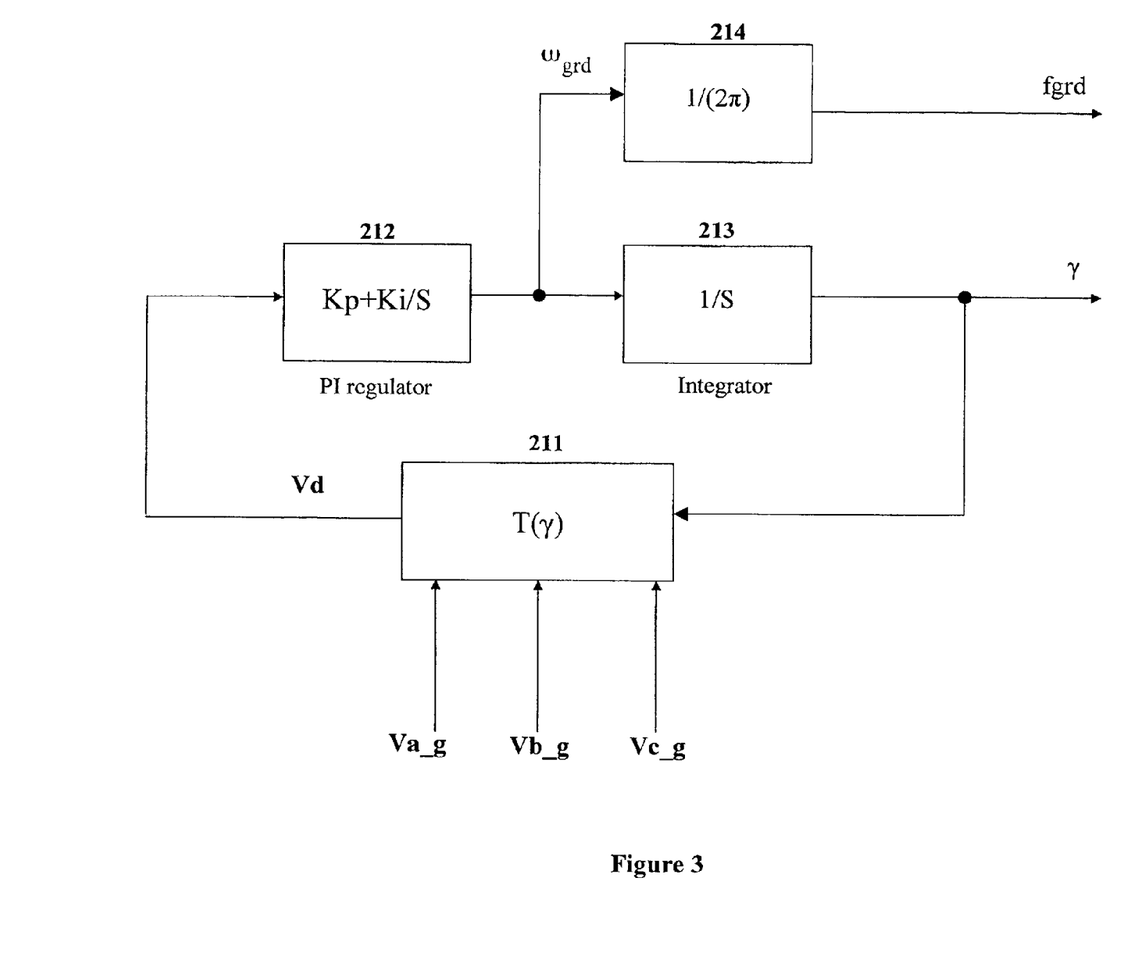
FIG. 3 is a functional block diagram of a phase locked loop (PLL) for use in the hybrid synchronization phase angle generator of FIG. 2.

The PLL controller 210 receives as inputs the grid phase voltages Va_g, Vb_g, and Vc_g in order to determine and lock-on to the grid phase angle $\gamma$. The principle of the PLL controller 210 of the present invention is shown in FIG. 3, in accordance with an embodiment of the present invention. The PLL controller 210 includes a transformation block or module 211, a proportional-integral (PI) regulator module 212, an integrator module 213, and a frequency converter module 214. The transformation module 211 receives the source phase voltages Va_g, Vb_g, and Vc_g that come into the PLL controller 210. To ensure a phase angle lock on, the transformation module 211 also receives a feedback of the output phase angle $\gamma$ and performs a transformation according to the following equation:

$$Vd = T(\gamma) = \text{Va\_g} \cdot \text{Sin}\gamma + \text{Vb\_g} \cdot \text{Sin}\left(\gamma - \frac{2\pi}{3}\right) + \text{Vc\_g} \cdot \text{Sin}\left(\gamma + \frac{2\pi}{3}\right);$$

Figure 4:
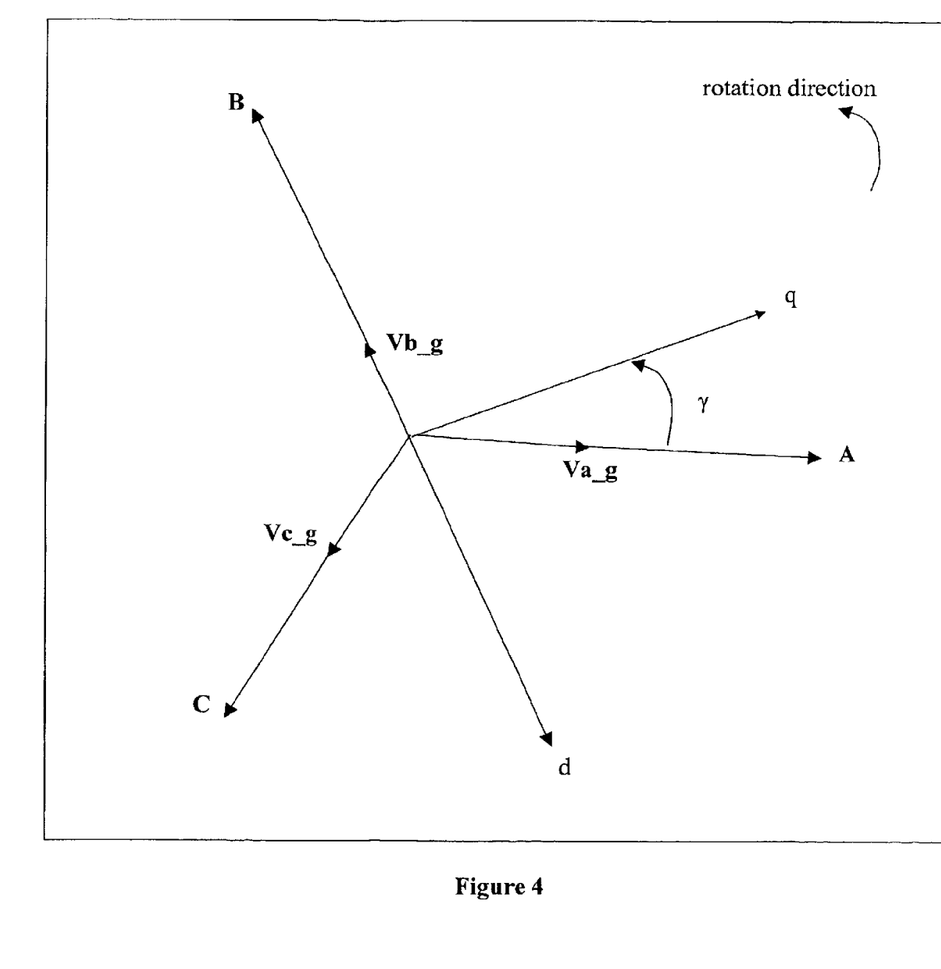
FIG. 4 is a graph of a set of synchronous transformation axes on which a transformation used in the PLL may be based.

This transformation is based on a set of synchronous transformation axes illustrated in FIG. 4. With reference to FIG. 4, axes A, B, and C are stationary and represent the three phase angles of the grid three-phase voltages. Axes q and d are rotating axes, and the grid phase angle $\gamma$ represents the rotating angle between axis q and axis A. The output Vd of the transformation module 211 is used as an input to the PI regulator block 212, which performs the following Laplace-transform:

$$PI = Kp + \frac{Ki}{S},$$

wherein Kp is the proportional gain and Ki is the integral time. The output of the PI regulator module 212 is the angular frequency $\omega_{grd}$ of the grid voltages. The cyclical or ordinary frequency $f_{grd}$ of the grid voltages can be computed from the angular frequency $\omega_{grd}$, by the frequency converter module 214, according to:

$$f_{grd} = \frac{1}{2\pi}\omega_{grd}.$$

The grid phase angle $\gamma$ can be derived from the grid angular frequency $\omega_{grd}$ by the integrator module 213 via integration of the Laplace transform:

$$\gamma = \frac{1}{S}(\omega_{grd}).$$

Thus, the PLL controller 210 provides two outputs, the phase angle $\gamma$ and frequency $f_{grd}$ of the grid three-phase voltages, as shown in FIG. 2, to be used in the digital controller 250. The output $\gamma$ is used as an input to both the $\theta_0$ generator module 251 and the fault grid angle detector module 252. The $\theta_0$ generator module 251 is used to generate the initial angle $\theta_0$ of the AC power source, which in turn is used as an input to the synchronization angle $\theta$ generation module 255.

If $\gamma_k$ represents the angle $\gamma$ at time step k, and $\gamma_{k-1}$ represents the angle $\gamma$ at time step k-1 for the digital controller 250, $\theta_0$ is generated by the following algorithm:

At time step k, if $\gamma_k$ changes its sign from positive to negative, i.e., $\gamma_{k-1}>0$ and $\gamma_k<0$, and $\Delta\gamma_{abs}=|\gamma_k-\gamma_{k-1}|>\pi$, then $\theta_0=\gamma_k$.

Figure 5:
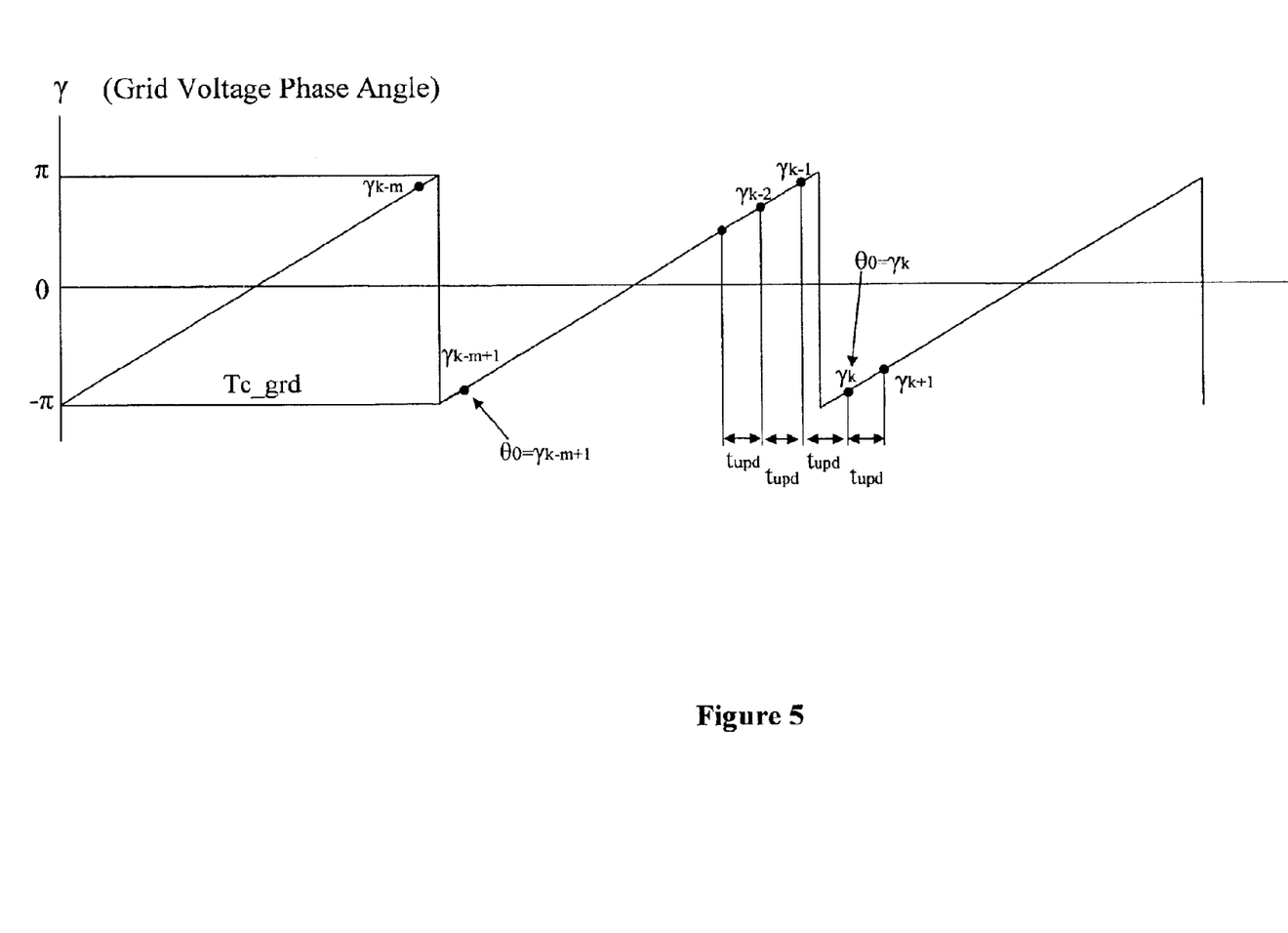
FIG. 5 is a graph of a phase angle versus time illustrating a principle of the algorithms for generating the initial phase angle $\theta_0$ of the AC power source voltages in accordance with the illustrated embodiments of the invention.

FIG. 5 illustrates the principle of the above operational algorithm, for the angle $\theta_0$ generation at the initiation of each cycle $T_{c\_grd}$. $T_{c\_grd}$ is the cycle time of the grid voltage (i.e., $T_{c\_grd}=1/f_{grd}$), and $t_{upd}$ is the updating period for the phase angles $\theta_k$ and $\gamma_k$ calculation (i.e., the sampling time period of the digital controller 250). Because AC voltage has sinusoidal waveform, angle $\theta_k$ has $2\pi$ as its cycle and repeats its values within $-\pi$ and $\pi$ in the above equation. Thus, $\theta_0$ is the initial phase angle at the initiation in each cycle ($-\pi$ and $\pi$) that is generated by $\theta_0$ generator module 251 and used for phase angle synchronization. Under normal operating conditions, the initial angle $\theta_0$ is upgraded with the frequency $f_{grd}$. When an abnormal operating condition occurs, a value "0" will be sent to the synchronization angle $\theta$ generation module 255 instead of the angle $\theta_0$ from the $\theta_0$ generator module 251, via the switch SW1 as illustrated in FIG. 2.

The fault grid angle detector module 252 is used to detect the abnormal operation of the grid voltage phase angle. When an abnormal angle change is detected, the output ER1 of the detector module 252 will change its logic level from "0" to "1" and open the switch SW1. As a result, the angle value "0" will be sent to module 255 as mentioned above. The following algorithm is implemented by the fault grid angle detector module 252 to detect the abnormal operation of the grid phase angle:

$\Delta\gamma = \gamma_k - \gamma_{k-1}$;
if $\Delta\gamma\_L < \Delta\gamma < \Delta\gamma\_H$, ER1=0;
Else ER1=1;

wherein $\Delta\gamma\_L$ and $\Delta\gamma\_H$ are pre-determined low and high limits of the grid angle change step in the normal operation.

The output grid voltage frequency $f_{grd}$ of the PLL controller 210 is used as an input to the step angle $\Delta\theta$ generator module 253 to generate the increment angle $\Delta\theta$ for input to the synchronization angle $\theta$ generation module 255. The $\Delta\theta$ generator module generates $\Delta\theta$ according to the following equation:

$$\Delta\theta = 2\pi \cdot (t_{upd}/T_{c\_grd}) = 2\pi \cdot t_{upd} \cdot f_{grd}.$$

Under normal operating conditions, the value of the increment angle $\Delta\theta$ is upgraded with the frequency $f_{grd}$. When an abnormal operating condition occurs, the increment angle $\Delta\theta$ generated by the step angle $\Delta\theta$ generator module 253 will not be sent to the synchronization angle $\theta$ generation module 255. Thus, $\Delta\theta$ in the synchronization angle $\theta$ generation module 255 keeps its previous value and will not be updated.

The fault grid frequency detector module 254 is used to detect the abnormal condition of the grid voltage frequency $f_{grd}$. When abnormal frequency condition is detected, the output ER2 of block 254 will change its logic level from "0" to "1" and open the switch SW2. The angle $\Delta\theta$ generated by the step angle $\Delta\theta$ generator module 253 will not be sent to the synchronization angle $\theta$ generation module 255, which will then keep the previous value of $\Delta\theta$, as mentioned earlier. Fault grid frequency detector module 254 implements the following algorithm to detect the abnormal operation of the grid frequency:

if $f_{grd\_L} < f_{grd} < f_{grd\_H}$, ER2=0;
Else ER2=1;

wherein $f_{grd\_L}$ and $f_{grd\_H}$ are predetermined low and high limits of the grid frequency $f_{grd}$ in the normal operation range.

As mentioned earlier, both the initial angle $\theta_0$ and the increment angle $\Delta\theta$ are inputs to the synchronization angle $\theta$ generation module 255 to generate the phase angle $\theta_k$ at step k for the AC power source 100 (FIG. 1) that is connected to the power grid 190. Thus, the phase angle $\theta_k$ should synchronize with the voltage phase angle $\gamma$ of the power grid 190 with which the AC power source 100 will operate in parallel. The synchronization angle $\theta$ generation module 255 generates the synchronization angle $\theta_k$ according to the following equation:

$\theta_k = \theta_0 + \theta_{k-1} + \Delta\theta$, $-\pi \leq \theta_k \leq \pi$, wherein $\theta_k$ is of course the desired phase angle of the output voltage of the AC power source 100 at time step k. As mentioned earlier, because AC voltage has sinusoidal waveform, angle $\theta_k$ has $2\pi$ as its cycle and repeats its values within $-\pi$ and $\pi$ in the above equation. $\theta_{k-1}$ is the phase angle at time step k-1. $\theta_0$ is the initial angle at the initiation in each cycle ($-\pi$ and $\pi$) that is generated by the initial angle $\theta_0$ generator module 251 and used for phase angle synchronization. $\Delta\theta$ is the angle increment for the time step $t_{upd}$ that is generated by step angle $\Delta\theta$ generator module 253. The value $\theta_k$ can be used to electronically set the phase angle of the output voltages of the AC power source 100, such as an SPC, at time step k in a manner understood in the art. The desired voltage phase angle of the AC power source 100 is digitally quantized with a sampling time period $t_{upd}$ for each time step k. In other words, the digital controller 250 updates the phase angle in every time step $t_{upd}$. The time step $t_{upd}$ is much smaller than the cycle time (20,000/16,666 $\mu$s) of normal 50/60 Hz voltages of the power grid 190 and AC power source 100. According to one exemplary embodiment of the present invention, $t_{upd}$ is approximately 50–200 $\mu$s.

With the above-described system and method for a synchronization phase angle generator, synchronization is guaranteed between an AC power source 100, such as a SPC, and a power grid 190 in normal operation. This is because the initial angle $\theta_0$ is equal to the actual grid voltage phase angle $\gamma$ at the initiation of every cycle. Voltage phase angle generation and synchronization for the AC power source 100 is also guaranteed even during abnormal operation. Furthermore, the hybrid use of a PLL controller 210 and a digital microprocessor-based controller 250 with modules 251, 252, 253, 254, and 255 for phase angle generation and synchronization eliminates the phase angle error that may be caused by the calculation and sampling delay of the digital controller. This is because the grid voltage phase angle generated from the PLL controller 210 is based on a feedback mechanism of the grid phase voltages, and the phase angle error associated with sampling delay of the digital controller 250 can be compensated by the PLL controller 210 when the phase angle is used for the PLL controller 210 to lock its phase with grid voltage phase. The phase angle generated from the PLL controller 210 is closer in value to the actual grid voltage phase angle. Furthermore, there is an integrator module 213 in the PLL controller 210, as shown in FIG. 3, that helps to suppress the noise influence for the initiation phase angle determination around zero crossing of each cycle of the grid voltage.

The above description sets out a three phase synchronization phase angle generator 200, and methods for synchronizing power phase and/or frequency between a three phase AC power source 100 and a power grid 190. Although specific embodiments of, and examples for, the invention are described herein for illustrative purposes, various equivalent modifications can be made without departing from the spirit and scope of the invention, as will be recognized by those skilled in the relevant art.

The teachings provided herein of the invention can be applied to other synchronization phase angle generators, not necessarily the three phase synchronization phase angle generator 200 generally described above. Additionally, many of the methods include optional acts or steps, and may include additional acts or steps, or perform the acts or steps in a different order, as will be recognized by those skilled in the relevant art. The synchronization phase angle generator 200 can have a different organization than the illustrated embodiment, combining some functions and/or eliminating some functions. The various embodiments described above can be combined to provide further embodiments.

These and other changes can be made to the invention in light of the above-detailed description. In general, in the following claims, the terms used should not be construed to limit the invention to the specific embodiments disclosed in the specification and the claims, but should be construed to include all AC conversion systems and methods that operate in accordance with the claims. Accordingly, the invention is not limited by the disclosure, but instead its scope is to be determined entirely by the following claims.

What is claimed is:

1. A synchronization phase angle generator for synchronizing an AC power source with a power grid, comprising:
    a phase locked loop (PLL) controller which receives at least one voltage of the power grid and determines a frequency and a phase angle of the at least one voltage of the power grid; and
    a microprocessor-based controller which receives as input the frequency and the phase angle of the at least one voltage of the power grid and determines a phase angle of at least one output voltage of the AC power source.

2. The synchronization phase angle generator of claim 1 wherein the power grid is a three-phase power grid with the at least one voltage of the power grid comprising a first phase voltage, a second phase voltage, and a third phase voltage, and wherein each of the first, the second and the third phase voltages has a magnitude and a phase angle.

3. The synchronization phase angle generator of claim 2 wherein the phase angle of the at least one voltage of the power grid is the phase angle of the first phase voltage of the power grid, and the phase angles of the second phase voltage and the third phase voltage of the grid are both 120° from the phase angle of the first phase voltage.

4. The synchronization phase angle generator of claim 1 wherein the determined phase angle of the at least one output voltage of the AC power source matches with the determined phase angle of the at least one phase voltage of the power grid, and the AC power source supplies the at least one output voltage with the matched phase angle to the power grid.

5. The synchronization phase angle generator of claim 1 wherein the PLL controller comprises:
    a transformation circuit module which receives the at least one voltage of the power grid and a feedback of the phase angle of the at least one voltage of the power grid and generates a first value based on a transformation of the at least one voltage of the power grid and the phase angle of the at least one voltage of the power grid.

6. The synchronization phase angle generator of claim 5 wherein the PLL controller further comprises:
    a proportional-integral (PI) regulator that determines the frequency of the at least one voltage of the power grid based on the generated first value.

7. The synchronization phase angle generator of claim 6 wherein the PLL controller further comprises:
    an integrator that determines the phase angle of the at least one voltage of the power grid based on the frequency of the at least one voltage of the power grid.

8. The synchronization phase angle generator of claim 1 wherein the microprocessor-based controller comprises:
    a first circuit module which generates an initial value for the phase angle of the at least one output voltage of the AC power source based on the phase angle of the at least one voltage of the power grid.

9. The synchronization phase angle generator of claim 8 wherein the microprocessor-based controller further comprises:
    a second circuit module which generates an increment value for the phase angle of the at least one output voltage of the AC power source over a predetermined time period based on the frequency of the at least one voltage of the power grid.

10. The synchronization phase angle generator of claim 9 wherein the predetermined time period is the sampling time period of the microprocessor-based controller.

11. The synchronization phase angle generator of claim 9 wherein the microprocessor-based controller further comprises:
    a third circuit module which receives the generated initial value and increment value for the phase angle of the at least one output voltage of the AC power source and determines the phase angle of the at least one output voltage of the AC power source.

12. The synchronization phase angle generator of claim 11 wherein the phase angle of the at least one output voltage of the AC power source comprises digitally quantized values.

13. The synchronization phase angle generator of claim 1 wherein the AC power source is a static power converter.

14. A method for synchronizing a polyphase power grid with a polyphase AC power source (APS), comprising:
    receiving a phase voltage of the polyphase power grid;
    performing a phase-locked-loop (PLL) operation to derive and lock on to a phase angle of the power grid phase voltage;
    generating a digitally quantized phase angle for an output phase voltage of the APS, wherein the generated phase angle of the APS output phase voltage is synchronized with the lock-on phase angle of the power grid phase voltage.

15. The method of claim 14 wherein receiving a phase voltage of the polyphase power grid comprises:
    receiving a phase voltage of each of a first phase, a second phase, and a third phase of the polyphase power grid.

16. The method of claim 14 wherein performing a PLL operation comprises:
    receiving a feedback of the phase angle of the power grid phase voltage;
    performing a transformation on the received phase voltage and the feedback phase angle to generate a transformed value;
    deriving a frequency of the power grid phase voltage; and
    deriving and locking on to the phase angle of the power grid phase voltage based on the transformed value.

17. The method of claim 16 wherein generating a digitally quantized phase angle for an APS output phase voltage comprises:
    generating an initial value for the digitally quantized phase angle based on the derived phase angle of the power grid phase voltage;
    generating an increment value for the digitally quantized phase angle over a predetermined sampling time period based on the derived frequency of the power grid phase voltage; and generating the digitally quantized phase angle for the APS output phase voltage based on the generated initial value and increment value.

18. The method of claim 17 wherein generating an initial value for the digitally quantized phase angle comprises:
   detecting whether there is an abnormal operation of the phase angle of the power grid phase voltage; and
   if the abnormal operation is detected, setting the initial value for the digitally quantized phase angle to zero.

19. The method of claim 17 wherein generating an increment value for the digitally quantized phase angle over a predetermined sampling time period comprises:
   generating an increment value for each of a plurality of consecutive time steps, wherein one of the time steps is separated from the next one of the time steps by the predetermined sampling time period;
   detecting whether there is an abnormal condition of the frequency of the power grid voltage; and
   if the abnormal condition is detected, setting the incremental value for one of the time steps to the incremental value of a previous one of the time steps.

20. The method of claim 15 wherein performing a PLL operation comprises:
   receiving a feedback of the phase angle of the power grid phase voltage; and
   performing a transformation on the received three-phase voltages and the feedback phase angle to generate a transformed value, wherein the transformation is based on the following equation:

$$T(\gamma) = Va\_g \cdot \text{Sin}\gamma + Vb\_g \cdot \text{Sin}\left(\gamma - \frac{2\pi}{3}\right) + Vc\_g \cdot \text{Sin}\left(\gamma + \frac{2\pi}{3}\right),$$

wherein $\gamma$ represents the feedback phase angle, $Va\_g$ represents the first phase voltage of the power grid, $Vb\_g$ represents the second phase voltage of the power grid, and $Vc\_g$ represents the third phase voltage of the power grid.

21. A synchronization phase angle generator for synchronizing an AC power source with a power grid, comprising:
   a phase locked loop (PLL) controller which receives at least one voltage of the power grid and determines a frequency and a phase angle of the at least one voltage of the power grid; and
   a microprocessor-based controller which receives as input the frequency and the phase angle of the at least one voltage of the power grid and determines a phase angle of at least one output voltage of the AC power source wherein the microprocessor-based controller is programmed to: determine an initial phase angle of the at least one voltage of the power grid from the phase angle of the at least one voltage of the power grid for each of a number of cycles of the at least one voltage of the power grid, determine an increment angle from the frequency of the at least one voltage of the power grid for at least one step during each of the number of cycles of the at least one voltage of the power grid, and determine the phase angle of the at least one output voltage of the AC power source for at least one step during each of the number of cycles of the at least one voltage of the power grid based on the determined initial phase angle and the determined increment angle of the at least one voltage of the power grid.

22. The synchronization phase angle generator of claim 21 wherein the microprocessor-based controller is programmed to determine the increment angle for a plurality of time steps during each of the number of cycles of the at least one voltage of the power grid.

23. The synchronization phase angle generator of claim 21 wherein the microprocessor-based controller is programmed to further determine whether an initial phase angle fault condition exists.

24. The synchronization phase angle generator of claim 23 wherein the microprocessor-based controller is programmed to further provide a value of zero as the initial phase angle if the initial phase angle fault condition exists.

25. The synchronization phase angle generator of claim 24 wherein the microprocessor-based controller is programmed to determine whether the determined phase angle of the at least one voltage of the power grid is between a defined lower phase angle limit and a defined upper phase angle limit, and to produce an initial phase angle fault indication if the determined phase angle of the at least one voltage of the power grid is not between the defined lower phase angle limit and the defined upper phase angle limit.

26. The synchronization phase angle generator of claim 21 wherein the microprocessor-based controller is programmed to further determine whether an increment angle fault condition exists.

27. The synchronization phase angle generator of claim 26 wherein the microprocessor-based controller is programmed to not update the initial phase angle with the determined increment angle if the increment angle fault condition exists.

28. The synchronization phase angel generator of claim 27 wherein the microprocessor-based controller is programmed to determine whether the determined frequency of the at least one voltage of the power grid is between a defined lower frequency limit and a defined upper frequency limit, and to produce an increment angle fault indication if the determined frequency of the at least one voltage of the power grid is not between the defined lower frequency limit and the defined upper frequency limit.

29. The synchronization phase angle generator of claim 21 wherein the power grid is a three-phase power grid with the at least one voltage of the power grid comprising a first phase voltage, a second phase voltage, and a third phase voltage, and wherein each of the first, and second and the third phase voltages has a magnitude and a phase angle.

30. The synchronization phase angle generator of claim 29 wherein the phase angle of the at least one voltage of the power grid is the phase angle of the first phase voltage of the power grid, and the phase angles of the second phase voltage and the third phase voltage of the grid are both 120° from the phase angle of the first phase voltage.

31. The synchronization phase angle generator of claim 29 wherein the determined phase angle of the at least one output voltage of the AC power source matches with the determined phase angle of the at least one phase voltage of the power grid, and the AC power source supplies the at least one output voltage with the matched phase angle to the power grid.

32. The synchronization phase angle generator of claim 21 wherein the PLL controller comprises:
   a transformation circuit module which receives the at least one voltage of the power grid and a feedback of the phase angle of the at least one voltage of the power grid and generates a first value based on a transformation of the at least one voltage of the power grid and the phase angle of the at least one voltage of the power grid.

33. The synchronization phase angle generator of claim 32 wherein the PLL controller further comprises:
   a proportional-integral (PI) regulator that determines the frequency of the at least one voltage of the power grid based on the generated first value.

34. The synchronization phase angle generator of claim 32 wherein the PLL controller further comprises:

an integrator that determines the phase angle of the at least one voltage of the power grid based on the frequency of the at least one voltage of the power grid.

35. The synchronization phase angle generator of claim 22 wherein the time steps is equal to the sampling time period of the microprocessor-based controller.

36. The synchronization phase angle generator of claim 21 wherein the phase angle of the at least one output voltage of the AC power source comprises digitally quantized values.

37. The synchronization phase angle generator of claim 21 wherein the AC power source is a static power converter.

38. A method for synchronizing a polyphase power grid with a polyphase AC power source (APS), comprising:

receiving a phase voltage of the polyphase power grid;

performing a phase-locked-loop (PLL) operation to derive a phase angle and a frequency of the phase voltage of the polyphase power grid and lock on to the phase angle of the power grid phase voltage;

determining an initial phase angle value from the derived phase angle of the phase voltage of the polyphase power grid for each of a number of cycles of the phase voltage of the polyphase power grid;

determining an increment angle value from the derived frequency of the phase voltage of the polyphase power grid for at least one step during each of the number of cycles of the phase voltage of the polyphase power grid; and determining the phase angle of an output phase voltage of the APS for at least one step during each of the number of cycles of the phase voltage of the polyphase power grid based on the determined initial phase angle value and the determined increment angle value, wherein the phase angle of the APS output phase voltage is synchronized with the lock-on phase angle of the power grid phase voltage.

39. The method of claim 38 wherein determining the phase angle of an output phase voltage of the APS for at least one step during each of the number of cycles of the phase voltage of the polyphase power grid comprises determining the phase angle of the output voltage of the APS for a plurality of steps during each of the number of cycles of the phase voltage of the polyphase power grid.

40. The method of claim 38, further comprising:

determining whether an initial phase angle fault condition exists.

41. The method of claim 40, further comprising:

providing a value of zero as the initial phase angle value if the initial phase angle fault condition exists.

42. The method of claim 41 wherein determining whether an initial phase angle fault condition exists comprises determining whether the derived phase angle of the at least one voltage of the polyphase power grid is between a defined lower phase angle limit and a defined upper phase angle limit.

43. The method of claim 38, further comprising:

determining whether an increment angle fault condition exists.

44. The method of claim 43, further comprising:

updating the initial phase angle value with the determined increment angle value only if the increment angle fault condition does not exist.

45. The method of claim 44 wherein determining whether an increment angle fault condition exists comprises determining whether the derived frequency of the at least one voltage of the polyphase power grid is between a defined lower frequency limit and a defined upper frequency limit.

46. The method of claim 38 wherein receiving a phase voltage of the polyphase power grid comprises:

receiving a phase voltage of each of a first phase, a second phase, and a third phase of the polyphase power grid.

47. The method of claim 38 wherein performing a PLL operation comprises:

receiving a feedback of the phase angle of the power grid phase voltage;

performing a transformation on the received phase voltage and the feedback phase angle to generate a transformed value;

deriving the frequency of the power grid phase voltage; and deriving and locking on to the phase angle of the power grid phase voltage based on the transformed value.

48. The method of claim 38 wherein generating an initial phase angle value for the derived phase angle comprises:

detecting whether there is an abnormal operation of the phase angle of the power grid phase voltage; and if the abnormal operation is detected, setting the initial phase angle value to zero.

49. The method of claim 38 wherein generating an increment angle value from the frequency of the phase voltage of the polyphase power grid for at least one step during each of the number of cycles of the phase voltage of the polyphase power grid comprises:

generating an increment angle value for each of a plurality of consecutive time steps, wherein one of the time steps is separated from the next one of the time steps by the predetermined sampling time period;

detecting whether there is an abnormal condition of the frequency of the power grid voltage; and if the abnormal condition is detected, setting the increment angle value for one of the time steps to an increment value of a previous one of the time steps.

50. The method of claim 38 wherein performing a PLL operation comprises:

receiving a feedback of the phase angle of the power grid phase voltage; and performing a transformation on the received three-phase voltages and the feedback phase angle to generate a transformed value, wherein the transformation is based on the following equation:

$$T(\gamma) = \text{Va\_g} \cdot \text{Sin}\gamma + \text{Vb\_g} \cdot \text{Sin}\left(\gamma - \frac{2\pi}{3}\right) + \text{Vc\_g} \cdot \text{Sin}\left(\gamma + \frac{2\pi}{3}\right),$$

wherein $\gamma$ represents the feedback phase angle, Va_g represents the first phase voltage of the power grid, Vb_g represents the second phase voltage of the power grid, and Vc_g represents the third phase voltage of the power grid.

* * * * *